Feb. 25, 1930.                 V. ARKIN                    1,748,436
                    HYDRAULIC POWER TRANSMISSION
                     Filed May 23, 1927        2 Sheets-Sheet 1

INVENTOR
V. ARKIN
BY
ATTORNEYS

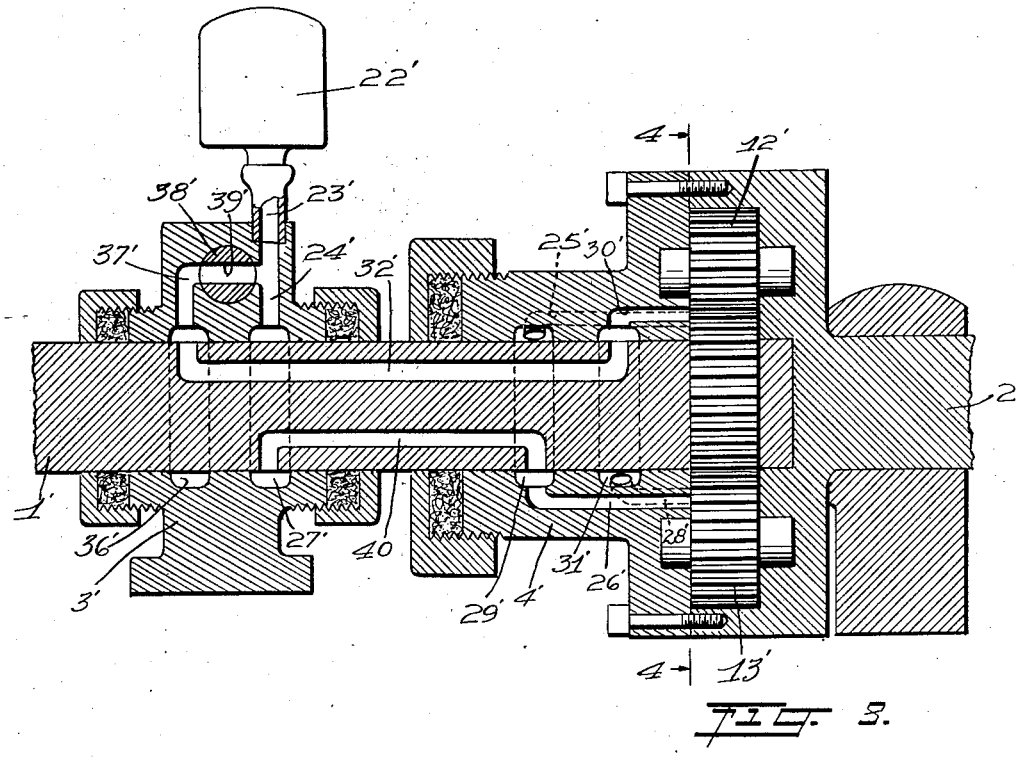
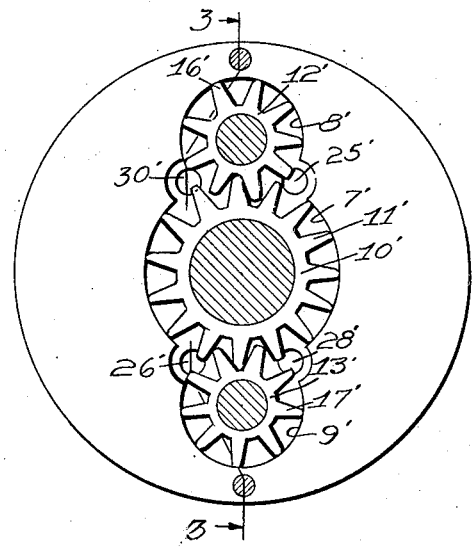

Patented Feb. 25, 1930

1,748,436

UNITED STATES PATENT OFFICE

VICTOR ARKIN, OF CHICAGO, ILLINOIS

HYDRAULIC POWER TRANSMISSION

Application filed May 23, 1927. Serial No. 193,691.

My invention relates to improvements in hydraulic power transmissions and it consists in the combination, constructions, and arrangements herein described and claimed.

An object of my invention is to provide a transmission of the character described in which a fluid is employed for effecting a driving engagement of one shaft with another as in the case of the engine shaft and the propeller shaft of a motor vehicle.

A further object of my invention is to provide a transmission of the character described in which the driving engagement of one shaft with another may be effected gradually with a cushioning effect, thereby eliminating all jolts and harsh mechanical connecting of one member with another as in the case of the ordinary type of mechanical transmission.

A further object of my invention is to provide a transmission of the type described which is silent in operation. This advantage is particularly important when my improved transmission is employed for a motor vehicle of the passenger type.

A further object of my invention is to provide a transmission of the character described in which the engagement of a drive shaft with the driven shaft may be gradually broken without injury or strain to any of the parts of the transmission.

A further object of my invention is to provide a transmission of the type described in which oil may be employed as the liquid element, thereby maintaining all the movable parts in perfectly lubricated condition.

Other objects and advantages will appear in the following specification, and the novel features of the invention will be particularly pointed out in the appended claims.

Figure 1:
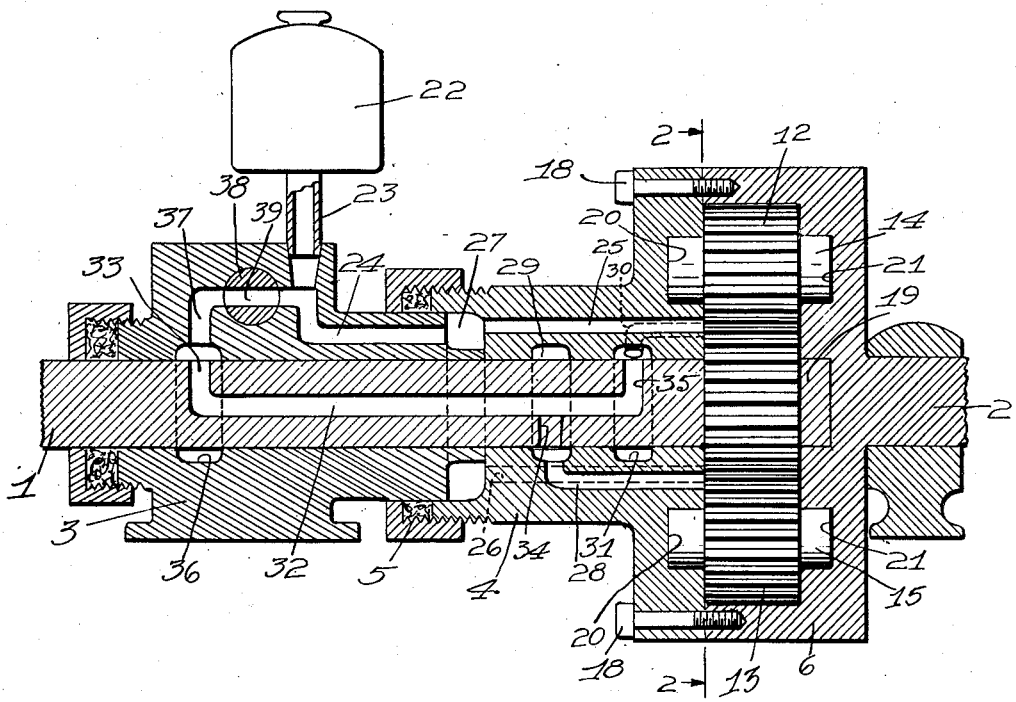
Figure 2:
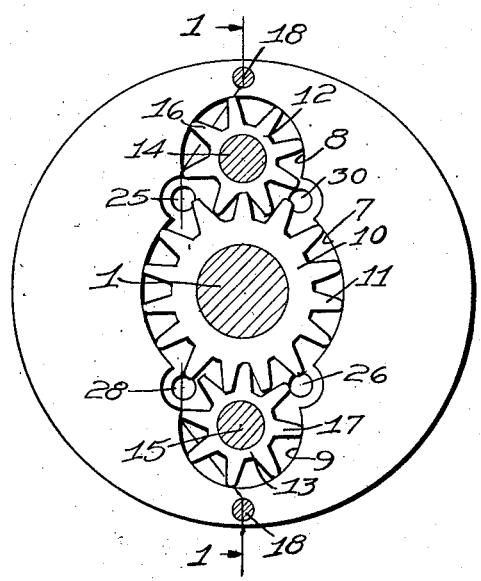

My invention is illustrated in the accompanying drawings, forming part of this application, in which Figure 1 is a section taken substantially along the line 1—1 of Figure 2, Figure 2 is a section along the line 2—2 of Figure 1, Figure 3 is a section substantially along the line 3—3 of Figure 4, and Figure 4 is a section along the line 4—4 of Figure 3.

In carrying out my invention, I make use of a drive shaft 1, ordinarily the engine or motor shaft. For the purpose of illustration, let us assume that the shaft 1 is the engine shaft of a motor vehicle. A second shaft 2 in axial alignment with the shaft 1 is connected with the differential of the motor vehicle, not shown. The shaft 1 shall be hereinafter referred to as the drive shaft and the shaft 2 as the driven shaft.

The drive shaft 1 is rotatably disposed in a main bearing 3 which is mounted upon any suitable support, not shown. A housing 4 is rotatably mounted upon the drive shaft 1 and extends over one end of the main bearing 3. A packing gland 5 forms a liquid-tight connection between the housing 4 and the bearing 3.

A casing 6 is integral with the driven shaft 2 and is provided with a main gear compartment 7 and auxiliary gear compartments 8 and 9. A main gear 10 is rigidly mounted upon the drive shaft 1 and is receivable in the compartment 7. The main gear 10 is provided with teeth 11 which engage with the walls of the compartment 7, thus preventing a liquid from passing therebetween as the gear is rotated. Auxiliary gears 12 and 13 are disposed in the compartments 8 and 9 and are rigidly mounted upon stub shafts 14 and 15, respectively. The auxiliary gears 12 and 13 are provided with teeth 16 and 17 which engage with the walls of the compartments 8 and 9, respectively, for preventing liquid from passing therebetween as the auxiliary gears are rotated. The housing 4 and the casing 6 are secured to each other by any suitable means, such as machine screws 18. The wall of the housing 4 is disposed adjacent the gears 10, 12 and 13 for completing the compartments 7, 8 and 9. The drive shaft 1 extends through the main gear 10 and is journalled in the casing 6 as at 19. The stub shafts 14 and 15 are journalled in the housing 4, as at 20, and the casing 6, as at 21.

A reservoir 22 is provided for containing a liquid, such as lubricating oil. The reservoir 22 is mounted upon the main bearing 3 by means of a pipe 23 which provides communication between the reservoir 22 and an inlet passageway 24 in the main bearing. The inlet passageway 24 is in communication with inlet passageways 25 and 26 in the housing 4 by means of an annular passageway 27 which is positioned between the main bearing 3 and the housing 4. The inlet passageway 25 is in communication with the compartments 7 and 8 at one side thereof, see Figure 2. The inlet passageway 26 is in communication with the compartments 7 and 9 at one side thereof. An outlet opening 28 is positioned in the housing 4 and has one end in communication with the compartments 7 and 9 at the side opposite the inlet 26. The other end of the outlet passageway 28 is in communication with an annular passageway 29 disposed in the housing 4 concentric with the drive shaft 1. An outlet passageway 30 is disposed in the housing 4 and has one end in communication with the compartments 7 and 8 opposite the inlet passageway 25. The other end of the outlet passageway 30 is in communication with an annular passageway 31 in the housing 4 and concentric with the drive shaft 1.

A longitudinally extending outlet passageway 32 is centrally disposed in the drive shaft 1 and is provided with laterally extending passageways 33, 34 and 35. The passageway 33 is in communication with an annular passageway 36 which is disposed in the main bearing 3 concentric with the drive shaft 1. The passageway 34 provides communication between the annular passageway 29 and the passageway 32. The passageway 35 provides communication between the annular passageway 31 and the passageway 32. A passageway 37 extends from the annular passageway 36 into communication with the inlet passageway 24. A rotatable valve 38 which is actuated by any suitable means, not shown, is provided with a passageway 39 and is adapted to shut off the passage of oil through the passageway 37.

From the foregoing description of the various parts of the device, the operation thereof is readily understood. Let us assume that power is applied to the drive shaft 1 and that the valve 38 is in the opened position, as shown in Figure 1. Rotation of the drive shaft 1 will cause rotation of the main gear 10 in a counter-clockwise direction, viewing Figure 2. The rotation of the main gear 10 in this direction will rotate the auxiliary gears 12 and 13 in a clockwise direction. During this rotation of the gears, the oil will be drawn into the compartments through the inlet passageways 25 and 26 from the passageways 24 and 27. A portion of the oil entering the compartments 7 and 8 through the inlet passageway 25 is carried between the teeth 11 of the main gear 10 in a circuitous path to the outlet passageway 28. The remainder of the oil entering through the inlet passageway 25 is carried between the teeth 16 in a circuitous path to the outlet passageway 30. A portion of the oil entering the compartments 7 and 9 through the inlet passageway 26 is carried between the teeth 11 of the main gear 10 in a circuitous path to the outlet 30. The remainder of the oil entering the inlet passageway 26 is carried between the teeth 17 of the auxiliary gear 13 in a circuitous path to the outlet passageway 28. As the oil is brought toward the outlet passageway 28 from between the teeth 11 and the teeth 17 of their respective gears 10 and 13, the oil is forced to pass outwardly through the passageway 28, the annular passageway 29, the passageway 34 into the longitudinally extending passageway 32. As the oil from between the teeth 11 and 16 of their respective gears 10 and 12 is brought toward the outlet 30, the oil is forced through the outlet 30, the annular passageway 31 and through the passageway 35 into the longitudinally extending passageway 32. The oil from the two outlet passageways 28 and 30 passes through the longitudinally extending passageway 32, through the passageway 33, the annular passageway 36, the passageway 37 and through the passageway 39 in the valve 38. At this point, the oil again starts its movement through the inlet passageways 24, 27, 25 etc. During this operation, the drive shaft 1 rotates with respect to the driven shaft 2.

Let us assume that the operator wishes to actuate the driven shaft. By rotating the valve 38 a slight distance, the passage of oil through the valve will be reduced, thus preventing the oil from the outlet passageways from passing through the valve at the speed required for actuating the gears freely. Therefore, as the gears are prevented from rotating freely, the continued rotation of the drive shaft 1 will start rotation of the driven shaft 2, although not at so great a speed. To increase the speed of the rotation of the driven shaft 2, the operator may continue the movement of the valve 38. As the valve 38 is rotated to gradually shut off the passage of oil therethrough, the gears are gradually checked in their movement with respect to the casing 6, and the speed of the driven shaft 2 is gradually increased until it has reached the speed of the rotation of the drive shaft 1 and rotates in unison therewith. The auxiliary gears 12 and 13 are governed in their rotation by the speed at which the oil is permitted to pass through the valve 38, and when the valve 38 is completely closed, the auxiliary gears 12 and 13 are held rigid. In this manner, when the auxiliary gears are held against rotation, they serve as a rigid connection between the drive shaft 1 and the driven shaft 2. If the operator is desirous of disconnecting the drive shaft from the driven shaft, he may do so in a similar manner to that in which they were connected by rotating the valve 38 for slowly bringing the passageway 39 into alignment with the passageway 37.

In Figures 3 and 4, I have shown a form which is similar to that shown in Figures 1 and 2. The main difference between the two forms is the placing of an inlet passageway 40 within the drive shaft 1' together with the outlet passageway 32'. The housing 4' is also completely separated from the main bearing 3', see Figure 3. The oil passes from the reservoir 22' through the tube 23', the passageway 24', through the annular passageway 27', through the passageway 40, through the annular passageway 29' and the inlet passageways 25' and 26'. The oil passing through the inlet passageways 25' and 26' enters the compartments 7', 8' and 9' and is carried through the compartments between the teeth 11', 16' and 17' of the main gear 10' and auxiliary gears 12' and 13', respectively, in the same manner as the oil is carried by the gears 10, 12 and 13, shown in Figure 2. The oil is carried between the teeth 11', 16' and 17' into communication with and forced through outlet openings 28' and 30'. The oil passing from the outlet openings 28' and 30' passes through the annular passageway 31' the passageway 32' through the annular passageway 36', the passageway 37' and through the opening 39' in the valve 38' to the inlet passageway 24'. This operation is continued as long as the valve 38' is in the position shown in Figure 3. The drive shaft 1' may be operatively connected to the driven shaft 2' by moving the valve 38' into closed position. By so doing, the passage for the oil from the gears is shut off, thus locking the gears against rotation with respect to each other and interlocking the drive shaft with the driven shaft.

The operations of the two forms are somewhat identical. It is obvious that the shafts 2 or 2' may be employed as the drive shafts and operatively connected to the motor, and the shafts 1 and 1' be employed as the driven shafts and operatively connected to the differential. It is also obvious that one auxiliary gear or several auxiliary gears may be employed and the device operate equally as well as with the two auxiliary gears, as shown.

I claim:

1. The combination with a pair of shafts mounted for rotation, of a main gear rigidly mounted upon one of said shafts, an auxiliary gear disposed in mesh with said main gear, a casing having compartments therein adapted to receive said gears integral with the other shaft, a housing for said first named shaft, a main bearing for said first named shaft, said housing, said first named shaft and said main bearing having inlet and outlet passageways therein, a liquid adapted to be drawn into the compartments through said inlet passageways and forced out through the outlet passageways from said compartments by the rotation of said gears within said compartments, and means for varying the flow of the liquid through said passageways and said compartments for varying the speed of the rotation of said auxiliary gear with respect to said main gear.

2. A device of the type described comprising a pair of shafts mounted for rotation, a main gear rigidly mounted upon one of said shafts, a plurality of auxiliary gears disposed in mesh with said main gear, a casing having compartments therein for retaining said gears integral with the other shaft, a housing secured to said casing and disposed concentric with said first named shaft, a main bearing for said first named shaft, said housing, said main bearing and said first named shaft having inlet and outlet passageways communicating with the compartments, a liquid adapted to be drawn into said compartments through said inlet passageways carried by said gears to said outlet passageways and forced therethrough, and a valve disposed between said inlet passageways and said outlet passageways for varying the speed of the circulation of said liquid therethrough, whereby the speed of the rotation of said auxiliary gears may be varied with respect to said main gear.

VICTOR ARKIN.